United States Patent
Jaeger et al.

(10) Patent No.: US 8,370,813 B2
(45) Date of Patent: *Feb. 5, 2013

(54) METHODS AND ARRANGEMENTS FOR UNIFIED PROGRAM ANALYSIS

(75) Inventors: Trent R. Jaeger, Croton-on-Hudson, NY (US); Lawrence Koved, Pleasantville, NY (US); Liangzhao Zeng, Ossining, NY (US); Xiaolan Zhang, New Caanan, CT (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

This patent is subject to a terminal disclaimer.

(21) Appl. No.: 12/177,280

(22) Filed: Jul. 22, 2008

(65) Prior Publication Data

US 2009/0019430 A1 Jan. 15, 2009

Related U.S. Application Data

(63) Continuation of application No. 11/119,553, filed on May 2, 2005, now Pat. No. 7,493,602.

(51) Int. Cl.
*G06F 9/45* (2006.01)
*G06F 9/44* (2006.01)
(52) U.S. Cl. .................... 717/126; 717/137
(58) Field of Classification Search ............. 717/126
See application file for complete search history.

(56) References Cited

U.S. PATENT DOCUMENTS

| | | | |
|---|---|---|---|
| 5,339,419 A * | 8/1994 | Chan et al. | 717/147 |
| 5,920,830 A * | 7/1999 | Hatfield et al. | 702/119 |
| 6,460,178 B1 * | 10/2002 | Chan et al. | 717/147 |
| 6,473,896 B1 | 10/2002 | Hicken et al. | |
| 6,609,248 B1 * | 8/2003 | Srivastava et al. | 717/147 |
| 7,299,454 B2 * | 11/2007 | Pugh et al. | 717/125 |
| 2002/0046393 A1 * | 4/2002 | Leino et al. | 717/7 |
| 2003/0154468 A1 * | 8/2003 | Gordon et al. | 717/143 |
| 2004/0015902 A1 | 1/2004 | Kosche et al. | |
| 2004/0040011 A1 * | 2/2004 | Bosworth et al. | 717/114 |
| 2004/0083464 A1 * | 4/2004 | Cwalina et al. | 717/141 |
| 2005/0015673 A1 | 1/2005 | Plesko et al. | |

OTHER PUBLICATIONS

Jennifer Hamilton. 2003. Language integration in the common language runtime. SIGPLAN Not. 38, 2 (Feb. 2003), 19-28. DOI=10.1145/772970.772973 http://doi.acm.org/10.1145/772970.772973.*
Zhang et al, "The Case for Analysis Preserving Language Transformation", Jul. 2006, ACM, ISSTA '06.
Jain et al, "Analysis Preserving Language Transformation", Mar. 8, 2006, IBM Research Report RC23907.
Wilson, R. P., French, R. S., Wilson, C.S., Amarasinghe, S.P., Anderson, J.M., Tjiang, S.W., Liao, S., Tseng, C., Hall, M.W., Lam, M.S., and Hennessy, J.L., 1994, SUIF: An infrastructure for research on parallelizing and optimizing compilers, SIGPLAN Not. 29, 12 (Dec. 1994), 31-34, DOI=http://doi.acm.org/10.1145/193209.193217.

(Continued)

*Primary Examiner* — James D Rutten
(74) *Attorney, Agent, or Firm* — Ference & Associates LLC

(57) ABSTRACT

A unified program analysis framework that facilitates the analysis of complex multi-language software systems, analysis reuse, and analysis comparison, by employing techniques such as program translation and automatic results mapping, is presented. The feasibility and effectiveness of such a framework are demonstrated using a sample application of the framework. The comparison yields new insights into the effectiveness of the techniques employed in both analysis tools. These encouraging results yield the observation that such a unified program analysis framework will prove to be valuable both as a testbed for examining different language analysis techniques, and as a unified toolset for broad program analysis.

12 Claims, 2 Drawing Sheets

ARCHITECTURE OF A UNIFIED ANALYSIS FRAMEWORK

OTHER PUBLICATIONS

Avots, D., Dalton, J. Livshits, V.B. and Lam, M.S. 2005, Improving software security with a C pointer analysis. In Proceedings of the 27th International Conference on Software Engineering (St. Louis, MO).

Doolin, D.M., Dongarra, J., and Seymour, K., "JLAPACK—Compiling LAPACK FORTRAN to Java", Jun. 11, 1998.

Baxter, I., Pidgeon, C., and Mehlich, M., DMS: Program Transformations for Practical Scalable Software Evolution, submitted to 26th International Conference on Software Engineering, May 23-28, 2004.

Erosa, A., and Hendren, L., Taming Control Flow: A Structured Approach to Eliminating Goto Statements, ACAPS Technical Memo 76, Sep. 29, 1993.

The SUIF 2 Compiler System. Available at http://suif.stanford.edu/suif/suif2/index.html.

The vortex project. Available at http://www.cs.washington.edu/research/projects/cecil/www/ vortex.html.

Ball, T. and Rajamani, S., Automatically validating temporal safety properties of interfaces. In SPIN 2001 Workshop on Model Checking of Software, May 2001.

Ball, T. and Rajamani, S., The slam project: Debugging system software via static analysis. In Proceedings of the 29th ACM Symposium on Principles of Programming Languages (POPL02), Jan. 2002.

Balzer, R.M., Goldman, N. M., and Wile, D. S., On the Transformational Implementation Approach to Programming. In Proceedings of the 2nd International Conference on Software Engineering, pp. 337-344, Oct. 1986.

Baxter, I.D., Pidgeon, C., and Mehlich, M., DMS: Program Transformations for Practical Scalable Software Evolution. In Proceedings of the 26th International Conference on Software Engineering, pp. 625-634, May 2004.

Chen, H., Dean, D., and Wagner, D., Model Checking One Million Lines of C Code. In Proceedings of the 11th Annual Network and Distributed System Security Symposium, San Diego, CA, Feb. 4-6, 2004.

Chen, H. and Wagner, D., MOPS: An Infrastructure for Examining Security Properties of Software. In Proceedings of the 9th ACM Conference on Computer and Communications Security, pp. 235-244, 2002.

Doolin, D. M., Dongarra, J., and Seymour, K., JLAPACK—Compiling LAPACK Fortran to Java. Technical report, University of Tennessee, Jun. 1998. Available at http://www.cs.utk.edu/ library/TechReports/1998/ut-cs-98-390.ps.Z.

Engler, D., Chelf, B., Chou, A., and Hallem, S., Checking system rules using system-specific, programmer-written compiler extensions. In Proceedings of the Fourth Symposium on Operation System Design and Implementation (OSDI), Oct. 2000.

Erosa, A. M., and Hendren, L. J., Taming Control Flow: A Structured Approach to Eliminating Goto Statements. In Proceedings of the 1994 International Conference on Computer Languages, pp. 229-240, May 16-19, 1994. Toulouse, France.

Foster, J., Fahndrich, M., and Aiken, A., A theory of type qualifiers. In ACM SIGPLAN Conference on Programming Language Design and Implementation (PLDI '99), pp. 192-203, May 1999.

Ganapathy, V., Jha, S., Chandler, D., Melski, D., and Vitek, D., Buffer overrun detection using linear programming and static analysis. In Proceedings of the 10th ACM Conference on Computer and Communications Security, pp. 345-354, Washington, DC, 2003.

Hallem, S., Chelf, B., Xie, Y., and Engler, D., A system and language for building system-specific static analyses. In ACM SIGPLAN Conference on Programming Language Design and Implementation (PLDI '02), Jun. 2002.

Brand, D., Arithmetic reasoning for static analysis of software. Technical Report 22905, IBM, Apr. 11, 2003, Computer Science.

Zhang, X., Jaegert, T., and Koved, L., Applying Static Analysis to Verifying Security Properties. In Proceedings of the 2004 Grace Hopper Celebration of Women in Computing Conference, Chicago, IL, 2004.

Zhang, X., Jaegert, T., and Koved, L., Applying Static Analysis to Verifying Security Properties, Technical Report 23246, IBM, Jun. 15, 2004, Computer Science.

Jain, S. K., Marceau, G., Zhang, X., Koved, L., and Jaeger, T., Intellect: INTErmediate-Language LEvel C Translator. In preparation, Mar. 5, 2006.

Jazillian, Inc. How to convert c to Java. Available at http://jazillian.com/how.html, Author unknown, "How Jazillian Translates Legacy Code to Java Code" Jul. 7, 2009.

Koved, L., Pistoia, M., and Kershenbaum, A., Access rights analysis for java. In Proceedings of the 17th Annual ACM Conference on Object-Oriented Programming, Systems, Languages, and Applications (OOPSLA 2002), pp. 359-372, Nov. 2002.

Martin, J., Ephedra—a c to Java migration environment, Apr. 2002. Ph.D. Dissertation, University of Victoria, Canada. Available at http://ovid.tigris.org/Ephedra/.

Novosoft. C to java converter. Available at http://in.tech.yahoo.com/020513/94/inxuw.html, Author unknown, "C2j Converter", Jul. 7, 2009, <http://tech.novosoft-us.com/product_c2j.jsp>.

Shankar, U., Talwar, K., Foster, J. S., and Wagner, D., Detecting format string vulnerabilities with type qualifiers. In Proceedings of the Tenth USENIX Security Symposium, pp. 201-216, 2001.

Wright, C., Cowan, C., Morris, J., Smalley, S., and Kroah-Hartman, G., Linux security modules: General security support for the Linux kernel. In Proceedings of the 11th USENIX Security Symposium, 2002.

Zhang, X., Edwards, A., and Jaeger, T.. Using cqual for static analysis of authorization hook placement. In Proceedings of the 11th USENIX Security Symposium, 2002.

\* cited by examiner

ARCHITECTURE OF A UNIFIED ANALYSIS FRAMEWORK

```
SWITCH (i) {
CASE 1:
    IF (COND)
        GOTO L1;
    BREAK;
CASE 2:

}
...
L1:
    DO_STH();
```

```
1.  SWITCH (i) {
2.  CASE 1:
3.      BOOLEAN GOTO_L1 = COND;
4.      IF (GOTO_L1)
5.          BREAK;
6.      BREAK;
7.  CASE 2:

8.
9.  }
10. IF (!GOTO_L1) {
11.
12. L1:
13.     DO_STH();
14. }
```

FIG. 2: A GOTO ELIMINATION EXAMPLE

```
1:  /* CODE FROM FS/READ_WRITE.C */
2:  SYS_1SEEK(UNSIGNED INT FD, ...) {
3:      STRUCT FILE * FILE = FGET (FD) {
4:      ...
5:      RETVAL = SECURITY_OPS →FILE_OPS
                  →11SEEK(FILE);
6:      IF (RETVAL) {
7:          // FAILED CHECK, EXIT
8:          GOTO BAD;
9:      }
10:     // PASSED CHECK, PERFORM OPERATION
11:     RETVAL = 11SEEK(FILE, ...);
12: }
```

FIG. 3: AN EXAMPLE OF AN LSM HOOK

METHODS AND ARRANGEMENTS FOR UNIFIED PROGRAM ANALYSIS

CROSS REFERENCE TO RELATED APPLICATIONS

This application is a continuation application of U.S. patent application Ser. No. 11/119,553 filed on May 2, 2005 now U.S. Pat. No. 7,493,602, the contents of which are hereby fully incorporated by reference in its entirety.

FIELD OF THE INVENTION

The present invention generally relates to arrangements for facilitating the analysis of complex multi-language software systems, analysis reuse and analysis comparison.

BACKGROUND OF THE INVENTION

Numerals in square brackets presented herebelow—[ ]—are keyed to the list of references found towards the close of the present disclosure.

Historically, static analysis tools have proven to be valuable in detecting software bugs in early development stages, e.g., at compilation time, and there have been a plethora of static analysis tools for various programming languages [3, 4, 9, 11, 14, 15, 19, 23, 25, 26] that can check a given piece of software against a set of invariants (properties). Many of these properties are language-independent (e.g., liveness properties such as deadlock-freeness, security properties such as complete mediation, etc.), thus it is desirable to make these tools available across all languages.

In addition, as software grows in size and complexity, it is not uncommon for a commercial software product to be written in multiple languages. For example, it is often necessary to mix C code in Java for improved performance. One would like to still be able to apply the same static analysis tools across the entire software, instead of the conventional segmented analysis approach where analyses are applied against only a subset of the code base.

Traditionally, people have approached this problem by porting the same analysis to different languages. This approach is not optimal: the porting efforts grow linearly with the number of new analyses, and the learning curve is steep for porting a tool to a new analysis engine.

Accordingly, a need has been recognized in connection with providing a language-neutral analysis framework, where one can plug and play various analysis algorithms without having to worry about which target language these analyses are developed for.

SUMMARY OF THE INVENTION

There is broadly contemplated herein, in accordance with at least one presently preferred embodiment of the present invention, a unified program analysis framework where program analyses include three phases: (i) translating the source programs into target language based on capability and availability of program analyzers on specific languages; (ii) applying the chosen analyses on the translated program; and (iii) mapping analysis results from the target language to the source language.

Compared to the traditional approach of porting every new analysis to all existing languages, the unified analysis framework is much more efficient. Once the translators for different languages are available, the efforts on porting the analysis tools to all possible languages become unnecessary in our framework. It should be noted that the number of translators is limited, given the limited number of languages, while the number of possible static analyses approach infinity, considering that new analyses can be introduced as static analysis techniques evolve. It is believed that such a unified analysis framework will enable the reuse of existing analyses that are already developed for other languages, thereby significantly reducing the cost of tool building and maximizing the return on the cost of developing these analyses.

From security analysis point of view, this is very desirable. It has been found that it is more effective to apply a collection of different analyses on a given software to provide better coverage of software bugs, because software bugs (especially security bugs) come in all different forms and shapes. Therefore, a unified analysis framework will greatly facilitate the application of a diverse set of analyses, and thus maximize the chances of uncovering software bugs by leveraging existing analyses that are already developed for other languages.

Such a language-neutral analysis framework provides some additional benefits, one of which being that one can now analyze multi-language software, i.e., software that is written in more than one language. An additional usage of the framework is to compare analysis written for different languages, which may yield new insights into the effectiveness of techniques employed in various analysis engines.

In summary, one aspect of the invention provides a method of analyzing multi-language programs, the method comprising the steps of: inputting a program containing elements written in a plurality of languages; inputting a rule set specifying allowable behaviors of a correct program; and detecting in the input program any violation relating to the rule set.

Another aspect of the invention provides an apparatus for analyzing multi-language programs, the apparatus comprising: an arrangement for inputting a program containing elements written in a plurality of languages; an arrangement for inputting a rule set specifying allowable behaviors of a correct program; and an arrangement for detecting in the input program any violation relating to the rule set.

Furthermore, an additional aspect of the invention provides a program storage device readable by machine, tangibly embodying a program of instructions executable by the machine to perform method steps for analyzing multi-language programs, the method comprising the steps of: inputting a program containing elements written in a plurality of languages; inputting a rule set specifying allowable behaviors of a correct program; and detecting in the input program any violation relating to the rule set.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2 provides code relating to a goto elimination example.

FIG. 3 provides code relating to an LSM hook.

DESCRIPTION OF THE PREFERRED EMBODIMENTS

Figure 1:
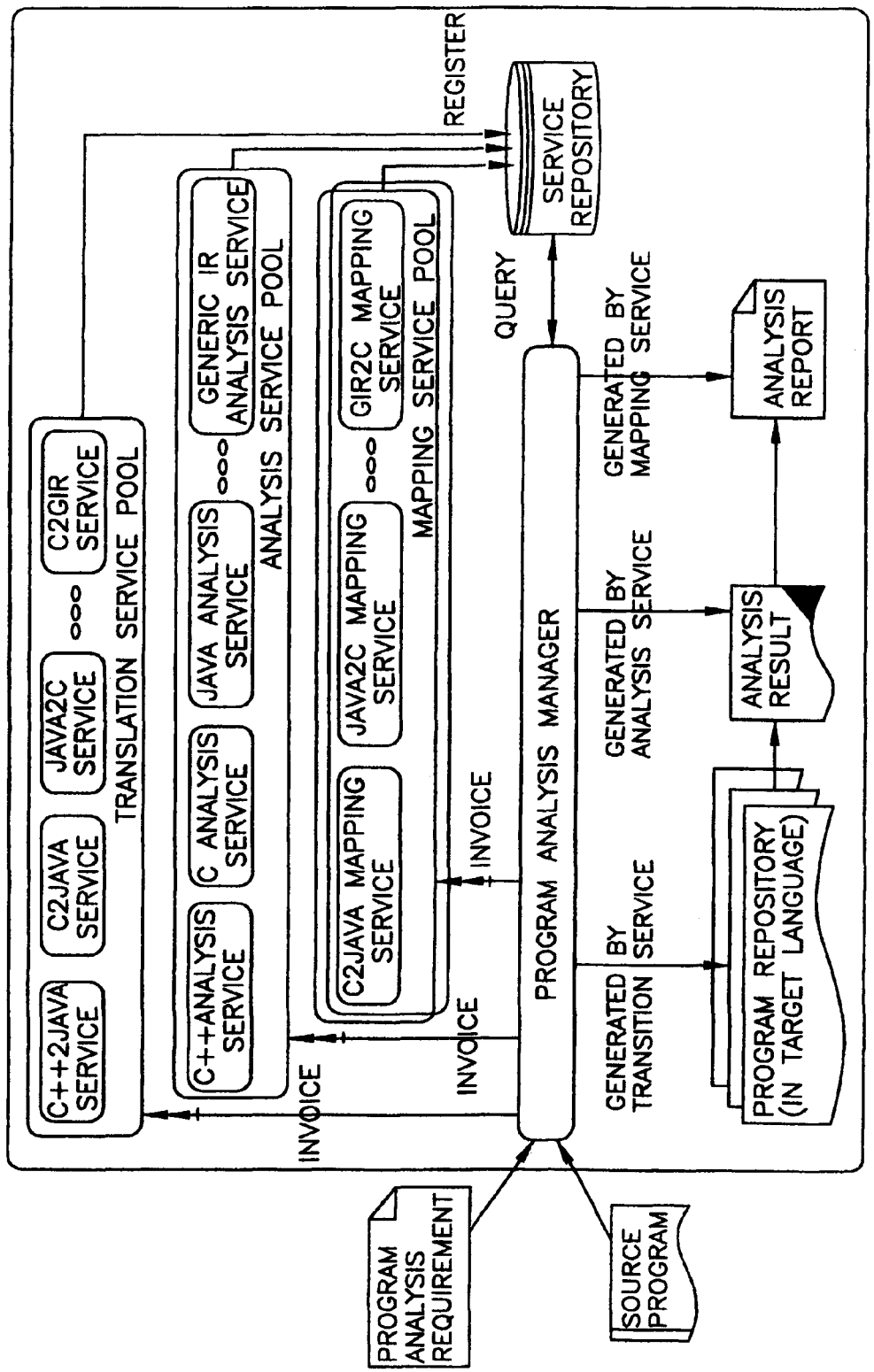
FIG. 1 schematically illustrates a unified program analysis framework.

Presented herebelow, in accordance with at least one presently preferred embodiment of the present invention, is a novel unified program analysis framework. First identified herebelow are major issues of building such a framework, and then solutions are illustrated using an end-to-end scenario. In particular, a complex C software (e.g., Linux kernel) is translated into Java, which is then fed into a Java analysis engine for checking a particular property. The results (code locations where violation of the property occurs) are then mapped back into the original C source code. The same analysis is performed on the original C code, using an analysis engine for C. By comparing the analysis results from these two analysis engines we verify the correctness of the translation. In addition, the comparison yields new insights into the impact of analysis techniques on the resulting precision and scalability.

FIG. 1 shows a unified program analysis framework in accordance with an embodiment of the present invention. The framework adopts service oriented architecture (SOA), where three category of services are included, namely translation services, analysis services and mapping services. These services are registered into the service repository.

A translation service takes as input a piece of software written in one or many source languages (e.g., C/C++), and translates it into the target language (e.g., Java, or a Generic Intermediate Representation (GIR)), for which the analyses are developed. This category of services needs to be invoked when the language of the source program and the target language the analysis engine supports are different. Note that the translation is not a completely faithful translation in the sense that the translated program typically does not execute the same way as the original program. Instead, the goal is to preserve sufficient data and control flow information so the analysis on the translated code is faithful, i.e., the analysis sees no difference between the above translated code, and the code produced by an ideal, truly faithful translator.

The analysis services preferably provide static analyses on program of the target language. Again, when the source language and the target language of the program analyzer are different, the mapping services need to be invoked in order to generate analysis reports with regard to the original source code of the input program.

In order to facilitate the description (interface, capability, etc) of these services, an ontology that defines basic concepts and terminologies in the domain of static analysis is preferably used. The ontology is also used when specifying the program analysis requirements and locating the service.

Static analyses are preferably performed in the following way: First, the end user specifies the requirements for program analysis and provides the source program, the program analysis manager then queries the service repository to locate analysis service that can satisfy the requirements. When the analysis service's target language is different from that of the source program, the program analysis manager locates the translation service which can translate the source program into the target language. When the translation service is invoked, the translation result is stored in the program repository, before being fed into selected analysis service. Once the analysis results are available, the program analysis manager locates the appropriate mapping service to generate a report corresponding to the original source code of the program being analyzed.

Herebelow, the above three categories of services are described in more detail.

In at least one embodiment of the present invention, the translation service is a crucial component. When the required analysis is implemented for a language other than the language of the source program, the translation service is invoked to transform the source program into the target language. There are many instances of translators, potentially one for each source and target language combination, e.g., a C-to-Java translator and vice versa.

Generally, faithfully translating between languages is a tricky proposition. Fortunately, since an objective is to analyze the translated code, not to execute it the translation only needs to be sufficiently precise for the analysis to work correctly.

Different languages support different approaches to data representation. These differences give each language an individual character. Consequently, mapping the data operations between languages often requires a significant transformation of the structure of the program. This difficulty is particularly visible when translating low-level data manipulation (such as C pointer arithmetics) to a high-level language (such as Java).

On the other hand, there is more common ground between the control-flow, and the data-flow structures of various languages. Many such constructs operate similarly across a broad family of imperative languages: basic blocks, functions, conditionals and loops, as well as lexical scopes and lexical bindings. Consequently, control and data-flow operations are easier to translate faithfully than operations on data representation.

Fortunately, most program analyses that can be thought of as being of interest [8, 9, 13, 19] are more sensitive to control and data flow, and much less sensitive to data values. For example, many C analysis engines assume type safety and ignore pointer arithmetics. Another common practice used by analysis engines is to collapse all references to various elements of an array to the 0th element. This means that for those analyses one generally does not need to keep track of the array index value during translation.

The translators take advantage of these observations and do not try to translate the data values faithfully in all cases. Instead, the translators tackle the potentially easier problem of preserving precise control and data flow information. However, even the easier problem of preserving precise control and data flow requires some careful engineering. Take the example of C and Java, in C, control of the program can be directed to any other statement in the same procedure using a pair of goto and label instructions. Java source code does not allow arbitrary branching—it is block structured and lacks a goto statement, though the object code does support conditional and unconditional branching.

Given an input program, the translator preferably generates an equivalent output program with regard to control and data flow. In general, the input program and the output program do not execute alike (in fact, the output program probably does not run at all). However, the difference cannot be observed by a typical program analysis engine.

To demonstrate the complex issues that arise in building a translator that precisely preserves the control/data flow information, described herebelow are techniques for tacking such issues, using a C-to-Java translator named FICtoJ as an example. Although the example is specific to C and Java, the techniques are sufficiently generic so they can be applied to building other translators.

The translation of basic data structures can be carried out in a straightforward way, while pointers may require some special handling. One important feature of a translator in accordance with at least one embodiment of the present invention lies in two aspects: implementing function pointers using virtual methods and anonymous inner classes in Java; and implementing goto translation in a way that does not modify control and data flow of the original program. Discussed herebelow as well are details that concern function pointers and goto statements.

Depending on whether the translation occurs at the source language level, or at the IL (intermediate language) level, there are typically two types of translators: source-to-source translators and IL-to-IL translators. Source-to-source translators produce more human-readable output, which facilitates debugging. In addition, the translation is more succinct, because it occurs at a higher, more abstract level. The main problem with source-to-source translation is goto elimination [12], which adds additional transformation overhead and may result in modified data/control flow in the translated code. IL-to-IL translators do not suffer from this problem, because all intermediate languages support the goto construct in one form or another. In initial experimentation, a source-to-source translator was implemented because of the associated ease of debugging.

TABLE 1

C to Java Mappings for Basic Language Constructs.

| C | Java |
|---|---|
|  | public class C_method { |
| Int x; | int x; |
| Float y; | float y; |
| Struct foo a; | foo a = new foo( ); |
| Void f1( ) { ... } | public void f1( ) { ... } |
| Int f2(int p1, ...) | public int f2(int p1, ...) |
| { ... } | { ... } |
|  | } |
| Typedef struct { | public class foo { |
|   Char c; | char c; |
|   Int i; | int i; |
|   Struct bar b; | class bar b = new bar( ); |
| } foo; | } |
| Struct foo *f; | foo[ ] f; |
| struct bar *b; | bar[ ] b; |
| f = (struct foo*)b; | f = (foo[ ])(Object)b; |

Table 1 shows the mapping between C and Java for basic language constructs. Basic types such as char, int and float in C are mapped directly to the same types in Java. Structures are mapped to classes with all fields set to public. Functions become public methods of a global class representing the entire file being translated. Structures and unions become classes with the corresponding fields.

Sideway casts (casts of class types that do not have inheritance relationship) are statically illegal in Java, so they are hidden away from the compiler with a cast to Object first.

One of the challenges in translating C to Java is of course dealing with pointers in C. Preferably, pointers in C can be mapped to arrays of length one in Java. Dereferencing a pointer thus becomes referencing the 0th element of the array. Similarly, variables and fields whose addresses are being taken are given an extra level of dereference via arrays of size 1. Accesses to these variables in C thus need to be mapped to accesses to the 0th element of the translated array variables. Table 2 shows translations for pointer related data structures.

TABLE 2

C to Java Mappings for Pointer Related Language Constructs.

| C | Java |
|---|---|
| struct foo *pf; | foo[ ] pf; |
| int i; | int i; |
| int *pi; | int[ ] pi; |
| int ai[3]; | int[ ] ai = new int[3]; |
| pf = malloc(sizeof( struct foo)); | pf = new foo[1] {new foo( )}; |

TABLE 2-continued

C to Java Mappings for Pointer Related Language Constructs.

| C | Java |
|---|---|
| pf□i = 23; | pf[0].i = 23; |
| *pi = i; | pi[0] = i; |
| int i; | int[ ] x = new int[1]; |
| i = 5; | i[0] = 5; |
| scanf("%i", &i); | scanf("%i"), i); |
| i++; | i[0]++; |
| int *pi = &i; | int[ ] pi = i; |
| (*pi)++; | pi[0]++; |
| f(pi); | f(pi); |

Previous approaches deal with function pointers using reflection, which changes the data/control flow of the original program in a significant way. FICtoJ, as broadly contemplated herein, takes a more elegant approach that maps function pointers in C to virtual methods in Java, making use of Java's support for anonymous inner classes. The mapping preferably involves 3 steps. All function pointers types are first mapped to Fn. The Fn class is constructed with one method named idrCall, but it is overloaded multiple times. For each signature of different length used at an indirect call site anywhere in the program, idrCall is overloaded one more time. Step 1 in Table 3 shows how this step works.

TABLE 3

C to Java Mappings for Function Pointers.

| | C | Java |
|---|---|---|
| Step 1. | int x; | int x; |
| | | ... |
| | | public class Fn { |
| | | ... |
| | x = (*fa)(23); | public int idrCall(int p1) { ... } |
| | x = (*fb)(23, 42); | public int idrCall(int p1, int p2) { ... } |
| | x = (*fc)("boo"); | public int idrCall(String p1) { ... } |
| | | } |
| Step 2. | int a(int p1) { ... } | public int a(int p1) { ... } |
| | int b(int p1, int p2) { ... } | public int b(int p1, int p2) { ... } |
| | int c(char *p1) { ... } | public int c(String p1) { ... } |
| | (int (*fa)(int)) = &a; | Fn fa = new Fn( ) { int idrCall(int p1) { return a(p1); } } |
| | (int (*fb)(int, int)) = &b; | Fn fb = new Fn( ) { int idrCall(int p1, int p2) { return b(p1, p2); } } |
| | (int (*fc)(char*)) = &c; | Fn fc = new Fn( ) { int idrCall(String p1) { return c(p1); } } |
| Step 3. | x = (*fa)(23); | x = fa.idrCall(23); |
| | x = (*fb)(23, 42); | x = fb.idrCall(23, 42); |
| | x = (*fc)("boo"); | x = fc.idrCall("boo"); |

Whenever the address of a function is being taken, the class Fn is preferably extended anonymously. The member method with matching arguments is overridden to now branch to the destination function, as shown in step 2 of Table 3. Finally, indirect call sites are then relinked to transit via the virtual function, as shown in Step 3.

Functions with variable arguments are preferably implemented with a method that has one argument of an Object array type. At each call to a variable argument function, the arguments are packed into an array before being passed to the variable argument function, as shown in Table 4.

In C, variable argument functions implement their own unpacking of the arguments. No attempts is made to translate the variety of unpacking protocols available. Rather unfortunately, this means the body of such function cannot be not processed and a warning is printed on standard error whenever one is omitted.

TABLE 4

C to Java Mappings for Variable Argument Functions.

| C | Java |
|---|---|
| void vafunc( ... ) ; | public abstract void vafunc (Object[ ] args); |
| foo a1; | foo a1; |
| bar a2; | bar a2; |
| vafunc(a1); | vafunc(new Object[ ] {a1}); |
| vafunc(a1, a2); | vafunc(new Object[ ] {a1, a2}); |
|  | public class Fn { |
|  |   public abstract void |
|  |   varfunc(Object[ ] args); |
|  |   public Object varargCall(Object[ ] args) { return null; } |
| foo a1; |   public Object idrCall(foo a1) |
|  |     { return varargCall(new Object[ ] {a1}); } |
| bar a2; |   public Object idrCall(foo a1, bar a2) |
|  |     { return varargCall(new Object[ ] {a1, a2}); } |
|  | } |
| fp = &vafunc; | Fn fp = new Fn( ) { |
|  |   Object varargCall(Object[ ] args) { |
|  |   return vafunc(args); } |
|  | }; |
| fp(a1); | fp.idrCall(a1); |
| fp(a1, a2); | fp.idrCall(a1,a2); |

Indirect calls to function with a variable number of arguments will hop yet one more time. First, the default bodies of the idrCall methods package their argument into an array. They then invoke another method of Fn: the varargcall method. The varargcall method can then be overridden when the address of a variable argument function is being taken. The overriding method is guaranteed to receive its arguments in an array with the correct number of arguments used at the call site.

Since FICtoJ is a source to source translation, and the Java language does not have the goto construct, the goto statements are preferably hidden in the Java code and reinserted in the byte code (which does support gotos). In contrast to the standard goto elimination algorithm [12] which introduces new variables and modifies the control and data flow of the original code, a goto translation algorithm as contemplated herein takes great care to avoid introducing spurious control or data paths so that the translation does not alter analysis results in any un-intended way.

With the standard goto elimination algorithm, even if the translated code runs correctly and produces the same results, the results from static analysis might still be different due to the side effects of the translation. The following example (FIG. 2) shows a simple C program and the resulting translation according to the goto elimination algorithm described in [12]. The introduction of the goto_L1 variable and the additional if (!goto_L1) statement in line 10 create an infeasible path that goes from statement 5 (the true block of the if (goto_L1) statement) to statement 11 (the true block of the if (!goto_L1) statement), and finally to statement 14. Although a precise static analysis tool (e.g., that supports path sensitivity) might detect that the two true blocks cannot both be executed (because the condition expressions in the two if statements are negations of each other), most static analysis tools do not support path sensitivity. And since one desirable objective a framework as broadly contemplated herein is to compare different static analysis algorithms, requiring them to support path sensitivity would defeat this original purpose. A goto translation algorithm as contemplated herein preferably does not introduce any new variables and infeasible paths.

Preferably, a goto translation algorithm is based on the JLAPACK tool [10] and uses a combination of simple control flow analysis and binary rewriting techniques to achieve the goal of preserving precise flow information. The algorithm preferably involves three stages. In the first stage, goto statements and their destination labels are converted into a dummy call pair Dummy.go_to("destination") and Dummy.label ("destination"), as illustrated by the following example:

| stmt1; | stmt1; |
|---|---|
| out: | -> Dummy.label("out"); |
| stmt2; | stmt2; |
| goto out; | Dummy.go_to("out"); |

In the second stage, the converted Java source is preferably compiled into Java class files. In the final stage, a binary rewriting tool called shrike [22] is preferably used to replace the dummy calls with real bytecode versions of goto statements.

The rewriting of goto statements with dummy calls can potentially make certain parts of the code unreachable, which is not allowed in Java. For example, stmt1 in the above code example could be a return statement, then the Java compiler will complain that stmt2 is unreachable (not surprisingly, a C compiler would allow such cases).

To solve this problem, in the first stage, some simple control flow analysis is preferably performed to determine if the goto destination statement is reachable after the translation. If it is not reachable, there is preferably replaced any statement before the destination statement that diverts the control flow (e.g. break, continue, and return) into corresponding dummy forms (e.g., Dummy.Return( )) that will pass the Java compiler. Note that a break statement is replaced with a pair of Dummy.go_to( ) and Dummy.label( ) statements, where the dummy label statement is inserted at the end of scope enclosing the break statement. If the break statement takes a label argument, then no additional dummy label statement is created. Similarly, a continue statement is replaced with a pair of Dummy.go_to( ) and Dummy.label( ) statements. Only in this case, the dummy label statement is inserted at the beginning of the inner-most loop scope.

Given a program analysis requirement, the program analysis manager finds the matching analysis engines and invokes them in the order specified. It is expected that each analysis service will specify the types of analysis it can perform, and the API of how it can be invoked. The analysis service pool covers a diverse set of analyses, some of which might be overlapping. Examples of analysis engines include CQUAL [13], a bug finding tool for C based on type qualifiers, BEAM [7], another C/C++ analysis engine that aims to find C programming bugs, and JaBA [19], an analysis engine for analyzing Java programs.

Described next herebelow are the requirements of an analysis service in accordance with at least one embodiment of the present invention, using JaBA as an example. An analysis service should preferably include an analysis backend (similar to the optimizing backends used in compilers) and a set of analysis built on top of it. For example, JaBA includes a program analysis backend that implements inter-procedural control and data flow analysis. In addition, JaBA's backend supports context sensitivity but not inter-procedural flow sensitivity, for scalability reasons. This is an explicit design choice, and as will be seen in the results section, seems to work out well for certain classes of analyses.

Examples of analyses include the access rights analysis for Java [19], which statically computes the access rights for a given class, and the dominance relationship analysis [26] that checks whether two events dominates each other in all possible execution paths. The set of possible analyses is large, and new analyses, such as race and deadlock detection, are continually being developed on top of JaBA and added to the repository of available analyses.

When the source language of the input program differs from the target language supported by the analysis, analysis results should be mapped back to the original source code, such that it appears to the end user as if the analysis were run on the original source code.

There exist standard techniques that store source code information (e.g., line numbers, function names) in various stages of compilation. For example, in the case of the GCC C compiler, the preprocessor generates source code information in the form of # lineno filename flag directives. In the compiled binary code (e.g., the ELF binary format), the information is stored in the symbol table. Similarly, in the Java case, the compiled Java class file contains the attributes section that stores symbolic and source information for various language constructs such as classes, fields, and methods.

During translation, the translation service can choose to convert the source code information directly into the format used in the compiled translated code, in which case the results can be directly reported with regard to the original source code, and the mapping service does not need to be invoked. Alternatively, the translator creates a source code map between the source and translated code (e.g., line 4 in the source code maps to line 47 in the translated code). By consulting this code map, the mapping service translates analysis results such that warnings and errors produced by the analysis refer back to the original source code.

By way of results, there is shown and described herebelow an example of how to use the unified program analysis framework. The example chosen compares static analyses that are developed on two different backends (for two different target languages, C and Java). The particular property to be verified is the complete mediation property of reference monitor interfaces. An example of reference monitor interfaces is the Linux Security Modules (LSM) interface [24]. LSM defines an interface for flexible, mandatory access control in the Linux kernel. LSM includes a set of generic authorization hooks that are inserted into the kernel source that enable kernel modules to enforce system access control policy for the kernel.

The code segment in FIG. 3 shows an example of what LSM hooks look like. The function sys_lseek( ) implements the system call lseek. The security hook, security_ops->file_ops->llseek(file) (line 5), is inserted before the actual work (the call llseek( ) at line 11) takes place. The goal is to check that all security-sensitive operations (e.g., llseek( )) are dominated by a check to the reference monitor (e.g., the security hook at line 5).

First is translation of the Linux from the source language, C, to the target language, Java (Phase (i)). The Linux kernel is one of the most complicated pieces of software written in C. The version translated in experimentation, version 2.4.9, contains about 300 thousands of lines of C code (the portion that is actually compiled by default in the RedHat 9.0 distribution). The compiled byte code is 4.2 MB in size. This demonstrates the robustness of the translator.

There is then applied the complete mediation analysis on the translated Java code (Phase (ii)). The complete mediation analysis is built on top of JABA, which employs a general algorithm called the dominance relationship checker that can be used to check the complete mediation property.

The analysis results are then mapped back to the original C language (Phase (iii)), and the results are compared with previous results obtained using the CQUAL tool [13], a type qualifier inferencing tool for C.

The comparison yielded several results. First, the analysis on JaBA finds all errors that were captured using the CQUAL tool. This proves that the translation from C to Java is correct. The analysis took one hour and thirty four minutes to run. Given the sophisticated nature of the analysis and the magnitude of the size of the kernel, this result demonstrates the scalability of the analysis. Finally, the analysis based on JaBA generated significantly fewer false positives, indicating that the techniques employed in the dominance checker improved its accuracy compared to the previous approach.

Both analyses use a combination of context-sensitive, flow-insensitive inter-procedure data flow analysis. The differentiating factors are that JaBA is intra-procedurally flow-sensitive, and that it models data structures and their fields more accurately (e.g., it does not collapse all fields and all variables of a struct type into a single global variable). The results indicate that for the complete mediation problem, these techniques improve the accuracy without sacrificing scalability.

In summary, it has been demonstrated that a unified program analysis framework in accordance with at least one embodiment of the present invention provides an environment where analyses developed for different languages can be compared which yields new insights into program analysis.

By way of contrast with related work, several compiler infrastructures exist that support analyses of more than one source language [1, 16, 2]. The Vortex compiler, for example, has front-ends for several Object-Oriented Languages including Java and C++. These Vortex front-ends translate the source code into the Vortex RTL intermediate representation, on top of which standard data and control flow analyses can be applied. While these systems deign to provide a common infrastructure for developing analysis for a limited set of languages, a framework as broadly contemplated herein aims to provide a generic methodology for applying program analyses. There is no limitation on the languages, or the analyses (provided that the translators exist for the target language). In contrast, the conventional systems can only run analyses built on top of their intermediate language.

In connection with program translation, Source-to-Source programming transformation is a standard technology for software maintenance and evolution [5, 6]. The goal is to automatically generate source code in the language of choice from a higher-level design specification, such that by modifying the specification one can evolve and/or port the software to a different language in an automatic way. The transformation is thus between a high-level specification language and a low-level implementation language.

In contrast, an objective as embraced herein is to transform the code in a way that preserves precise data and control flow information (with regard to the analysis), so that results from different analyses are comparable. There is thus performed direct source to source translation between two languages of comparable levels.

A large number of direct C-to-Java translators exist, including Jazillian [18], Ephedra [20], and C2J [21]. As with most source-to-source transformation systems, these translators aim to produce target code that execute the same way as the source code. As such the translation occurs at a higher semantic level, but the resulting Java file does not necessarily have the exact same data/control flow, which makes them unsuitable for purposes such as those contemplated herein.

In addition, because these tools lack a high-level design specification, they need to do quite some guess work in order to produce functionally equivalent code. As a result there are cases that the heuristics employed in these tools might not cover, and consequently they are not guaranteed to work 100% of the time. In contrast, a translation as contemplated herein covers a much larger set of cases. The resulting Java file, however, does not run unmodified in general.

Another major difference between these mainstream C-to-Java translators and a translator as contemplated herein lies in the goto statement elimination algorithm, which is described in detail further above.

Ephedra [20] is another C-to-Java translator that shares similar goals with Jazillian. As with Jazillian, Ephedra is a source-to-source translator. Thus it suffers the same goto elimination problem. Ephedra does not in fact appear to deal with gotos.

C2J [21] is yet another C-to-Java translator that aims to achieve the same goal as the previous two translators. Judging from the limited documentation, it appears that C2J is also a source-to-source translator and it at least suffers the same limitations as the other two translators.

In further recapitulation, there is proposed herein a novel unified program analysis framework where analyses developed for a specific target language can be reused to analyze programs written in a language different from the target language. Described herein is the architecture of such a framework, and the issues and technical difficulties of building such a framework are discussed along with a presentation of solutions to these challenges. In order to demonstrate feasibility and effectiveness, analysis on the Linux kernal in a framework as contemplated herein has been performed, where the Linux kernal is first translated from its source language (C) to a target language (Java), the dominance relationship analysis (developed for Java) is then applied on the translated kernel, and finally a comparison is made between the results from the Java analysis with previous results obtained using an analysis built for C. The comparison yields new insights into the effectiveness of the techniques employed in both analysis tools. Thus, it is believed that such a unified program analysis framework will prove to be valuable both as a testbed for examining different language analysis techniques, and as a unified toolset for broad program analysis.

It is to be understood that the present invention, in accordance with at least one presently preferred embodiment, includes an arrangement for inputting a program containing elements written in a plurality of languages; an arrangement for inputting a rule set specifying allowable behaviors of a correct program; and an arrangement for detecting in the input program any violation relating to the rule set. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

References

[1] The SUIF 2 Compiler System. Available at http://suif-.stanford.edu/suif/suif2/index.html.

[2] The vortex project. Available at http://www.cs.washington.edu/research/projects/cecil/www/vortex.html.

[3] T. Ball and S. Rajamani. Automatically validating temporal safety properties of interfaces. In *SPIN 2001 Workshop on Model Checking of Software*, May 2001.

[4] T. Ball and S. Rajamani. The slam project: Debugging system software via static analysis. In *Proceedings of the 29th ACM Symposium on Principles of Programming Languages (POPL02)*, January 2002.

[5] R. M. Balzer, N. M. Goldman, and D. S. Wile. On the Transformational Implementation Approach to Programming. In *Proceedings of the 2nd International Conference on Software Engineering*, pages 337-344, October 1986.

[6] I. D. Baxter, C. Pidgeon, and M. Mehlich. DMS: Program Transformations for Practical Scalable Software Evolution. In *Proceedings of the 26th International Conference on Software Engineering*, pages 625-634, May 2004.

[7] D. Brand. Arithmetic reasoning for static analysis of software. Technical Report 22905, IBM, April 2003.

[8] H. Chen, D. Dean, and D. Wagner. Model Checking One Million Lines of C Code. In *Proceedings of the 11th Annual Network and Distributed System Security Symposium*, San Diego, Calif., Feb. 4-6, 2004.

[9] H. Chen and D. Wagner. MOPS: An Infrastructure for Examining Security Properties of Software. In *Proceedings of the 9th ACM Conference on Computer and Communications Security*, pages 235-244, 2002.

[10] D. M. Doolin, J. Dongarra, and K. Seymour. JLAPACK—Compiling LAPACK Fortran to Java. Technical report, University of Tennessee, June 1998. Available at http://www.cs.utk.edu/library/TechReports/1998/ut-cs-98-390.ps.Z.

[11] D. Engler, B. Chelf, A. Chou, and S. Hallem. Checking system rules using system-specific, programmer-written compiler extensions. In *Proceedings of the Fourth Symposium on Operation System Design and Implementation (OSDI)*, October 2000.

[12] A. M. Erosa and L. J. Hendren. Taming Control Flow: A Structured Approach to Eliminating Goto Statements. In *Proceedings of the 1994 International Conference on Computer Languages*, pages 229-240, May 16-19, 1994. Toulouse, France.

[13] J. Foster, M. Fahndrich, and A. Aiken. A theory of type qualifiers. In *ACM SIGPLAN Conference on Programming Language Design and Implementation (PLDI '99)*, pages 192-203, May 1999.

[14] V. Ganapathy, S. Jha, D. Chandler, D. Melski, and D. Vitek. Buffer overrun detection using linear programming and static analysis. In *Proceedings of the 10th ACM Con-* ference on *Computer and Communications Security*, pages 345-354, Washington, D.C., 2003.
[15] S. Hallem, B. Chelf, Y. Xie, and D. Engler. A system and language for building system-specific static analyses. In *ACM SIGPLAN Conference on Programming Language Design and Implementation (PLDI '02)*, June 2002.
[16] IBM. The Toronto portable optimizer.
[17] S. K. Jain, G. Marceau, X. Zhang, L. Koved, and T. Jaeger. INTELLECT: INTErmediate-Language LEvel C Translator. In preparation.
[18] Jazillian, Inc. How to convert c to java. Available at http://jazillian.com/how.html.
[19] L. Koved, M. Pistoia, and A. Kershenbaum. Access rights analysis for java. In *Proceedings of the 17th Annual ACM Conference on Object-Oriented Programming, Systems, Languages, and Applications (OOPSLA 2002)*, pages 359-372, November 2002.
[20] J. Martin. Ephedra—a c to java migration environment, April 2002. Ph.D. Dissertation, University of Victoria, Canada. Available at http://ovid.tigris.org/Ephedra/.
[21] Novosoft. C to java converter. Available at http://in-.tech.yahoo.com/020513/94/1nxuw.html.
[22] R. W. O'Callahan. The shrike toolkit. Available at http://org.eclipse.cme/contributions/shrike/.
[23] U. Shankar, K. Talwar, J. S. Foster, and D. Wagner. Detecting format string vulnerabilities with type qualifiers. In *Proceedings of the Tenth USENIX Security Symposium*, pages 201-216, 2001.
[24] C. Wright, C. Cowan, J. Morris, S. Smalley, and G. Kroah-Hartman. Linux security modules: General security support for the Linux kernel. In *Proceedings of the 11th USENIX Security Symposium*, 2002.
[25] X. Zhang, A. Edwards, and T. Jaeger. Using equal for static analysis of authorization hook placement. In *Proceedings of the 11th USENIX Security Symposium*, 2002.
[26] X. Zhang, T. Jaegert, and L. Koved. Applying Static Analysis to Verifying Security Properties. In *Proceedings of the 2004 Grace Hopper Celebration of Women in Computing Conference, Chicago, Ill.*, 2004.

What is claimed is:

1. A method of analyzing multi-language programs, said method comprising using a processor coupled to memory to execute the steps of:
   inputting a program containing elements written in a plurality of languages;
   inputting a rule set specifying allowable behaviors of a correct program;
   using a program analysis manager to locate an analysis service and a translation service;
   using said translation service to translate said program elements to a common intermediate representation;
   using said analysis service to detect in the input program any violation relating to the rule set;
   said detecting step comprising employing the common intermediate representation in detecting a violation relating to the rule set;
   using said program analysis manager to locate a mapping service; and
   using said mapping service to map back to an original source code any detected violation relating to the rule set.

2. The method according to claim 1, further comprising the step of ensuring that the input program avoids any violation relating to the rule set.

3. The method according to claim 1, further comprising the step of mapping back to an original source code any violation relating to the rule set.

4. The method according to claim 1, further comprising the step of:
   transforming the input program;
   said transforming step comprising the step of preserving of data and control flow information relating to the input program in a predetermined amount and to a predetermined degree of precision.

5. The method according to claim 1, further comprising the steps of:
   translating multiple languages to a common intermediate representation; and
   employing the common intermediate representation to verify that the said rules are not violated.

6. The method according to claim 5, further comprising the step of mapping back to an original source code any violation relating to the rule set.

7. An apparatus for analyzing multi-language programs, said apparatus comprising:
   a processor;
   a memory storing instructions executable by the processor for:
   inputting a program containing elements written in a plurality of languages;
   inputting a rule set specifying allowable behaviors of a correct program; and
   using a program analysis manager to locate an analysis service and a translation service;
   using said translation service to translate said program elements to a common intermediate representation;
   using said analysis service to detect in the input program any violation relating to the rule set;
   said detecting step comprising employing the common intermediate representation in detecting a violation relating to the rule set;
   using said program analysis manager to locate a mapping service; and
   using said mapping service to map back to an original source code any detected violation relating to the rule set.

8. The apparatus according to claim 7, further comprising an arrangement for ensuring that the input program avoids any violation relating to the rule set.

9. The apparatus according to claim 7, further comprising an arrangement for mapping back to an original source code any violation relating to the rule set.

10. The apparatus according to claim 7, further comprising:
    an arrangement for transforming the input program;
    said transforming arrangement comprising an arrangement for preserving data and control flow information relating to the input program in a predetermined amount and to a predeteimined degree of precision.

11. The apparatus according to claim 7, further comprising:
    an arrangement for translating multiple languages to a common intermediate representation;
    said detecting arrangement being adapted to employ the common intermediate representation in detecting a violation relating to the rule set.

12. A program storage device readable by machine, tangibly embodying a program of instructions executable by the machine to perform method steps for analyzing multi-language programs, said method comprising the steps of:
    inputting a program containing elements written in a plurality of languages;
    inputting a rule set specifying allowable behaviors of a correct program; and using a program analysis manager to locate an analysis service and a translation service;
using said translation service to translate said program elements to a common intermediate representation;
using said analysis service to detect in the input program any violation relating to the rule set;
said detecting step comprising employing the common intermediate representation in detecting a violation relating to the rule set;
using said program analysis manager to locate a mapping service; and
using said mapping service to map back to an original source code any detected violation relating to the rule set.

\* \* \* \* \*